Feb. 3, 1959 J. W. HILL 2,871,508
FILLING MACHINE HORN
Filed Sept. 30, 1955
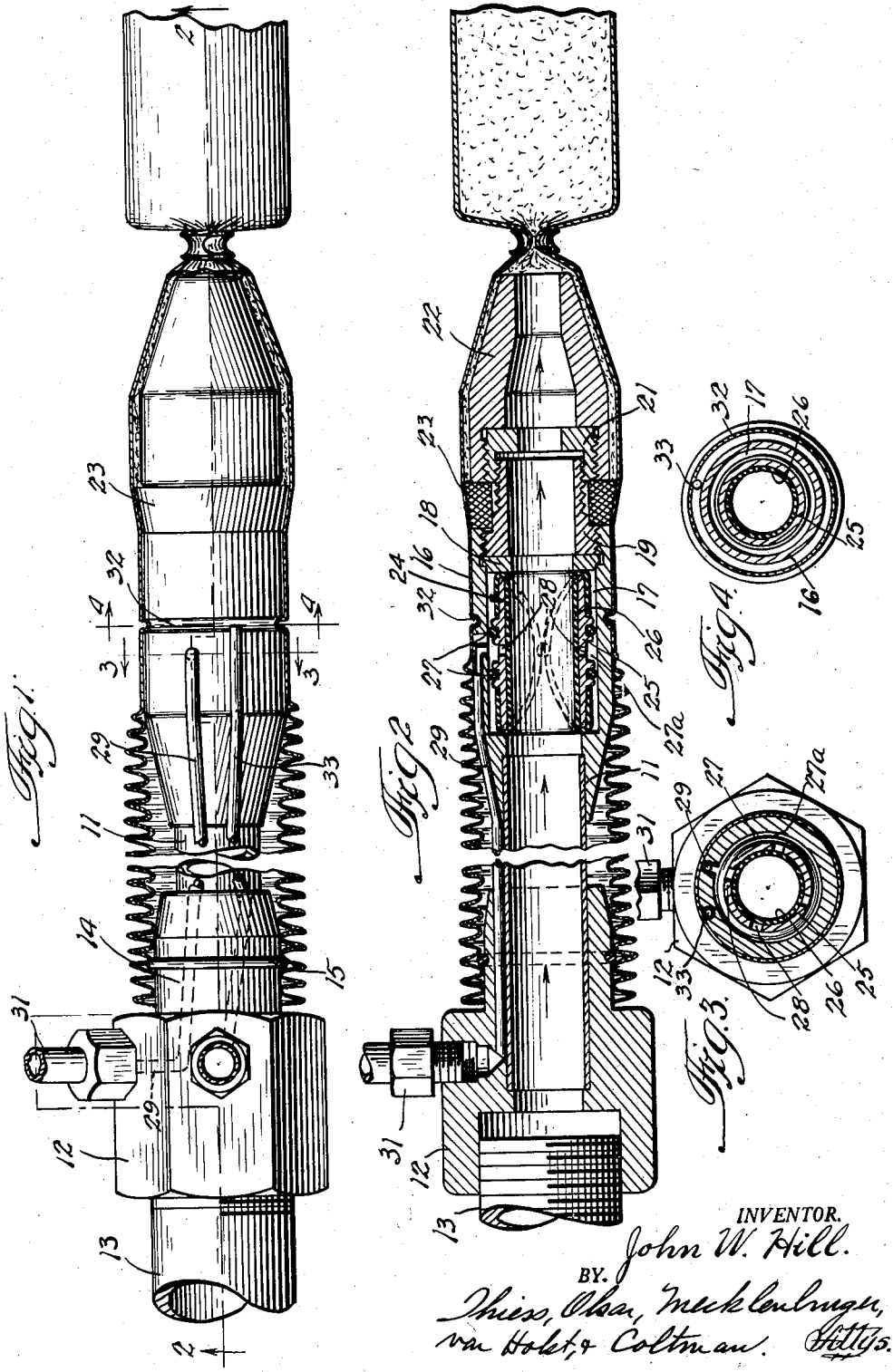
INVENTOR.
John W. Hill.
BY Thiess, Olsen, Mecklenburger, van Holst, & Coltman. Attys.

United States Patent Office 2,871,508
Patented Feb. 3, 1959

2,871,508

FILLING MACHINE HORN

John W. Hill, Chicago, Ill., assignor to The Globe Company, Chicago, Ill., a corporation of Illinois Application September 30, 1955, Serial No. 537,809

5 Claims. (Cl. 17—41)

The present invention relates to a filling machine and has special reference to a filling horn or nozzle for supplying plastic or other flowable material to casings, such as sausage casings, and other flexible containers.

This application is a continuation-in-part of my co-pending application Serial No. 238,495 filed July 25, 1951, now abandoned.

More particularly this invention relates to a filling horn or nozzle which is particularly suitable for use in filling continuous lengths of casings or other flexible containers with individual charges of material which may be maintained separate in the casings by clipping, tying or crimping the casing between the charges of the material. The horn may receive the material from a metering machine that supplies predetermined charges thereof under substantial pressure or from any other suitable source that supplies the material under desired pressure.

The filling horn embodying the present invention may comprise a tubular member having a central passageway therein through which charges of filling material are fed and over which an extensive length of tubular casing material may be placed and longitudinally compressed or shirred. In this manner a long continuous length of casing may be positioned over the horn.

At the discharge end of the horn, control means are provided for retarding the feed of the casing thereover. As the outer end of the casing is closed, the discharge of material into the casing acts to pull the casing outwardly while the control means retards the movement of the casing sufficiently to prevent any wrinkling of the casing and to cause the desired compactness of material therein.

Between the control means for the casing and the outer end of the horn a sealing or barrier member is provided which prevents any of the material discharged from the horn from backing up over the horn and into the casing portion rearwardly of the barrier. The barrier also prevents the passage of air rearwardly thereof which might affect the operation or efficiency of the casing feed control means.

The discharge end of the horn converges so that the desired charge of the material may be fed into the casing which is preferably constricted adjacent the discharge end of the horn. Thus, after a portion of the casing has been filled, a clip or other closing member may be applied to the constricted portion of the casing without causing undue strain on the casing.

Valve means are also provided in the discharge passageway adjacent the discharge end of the horn for preventing the passage of material thereby during the time it is desired to crimp or clip the casing to separate charges of material therein.

An object of the present invention is to provide a filling horn for supplying charges of material to continuous lengths of flexible casing or other containers.

Another object is to provide such a horn having means for controlling the feed of the casing material over the horn.

A further object is to provide a filling machine having an efficient cut-off valve for preventing the exuding of the product between the feed of predetermined charges.

Still another object is to provide a filling horn which may be easily and quickly dismantled and assembled and readily cleaned.

A still further object is to provide a filling horn which will permit the filled casing to be readily crimped or clipped without causing undue strain to the casing.

Another object is to provide a filling horn of the above type which will prevent the passage of material rearwardly between the horn and the casing.

Further objects and advantages will be apparent from the following description and claims when considered with the accompanying drawings, in which Fig. 1 is a top plan view of a filling horn embodying the present invention with a section of flexible casing thereover shown partially in section;

Fig. 2 is a longitudinal cross-sectional view taken on the line 2—2 of Fig. 1;

Fig. 3 is a transverse cross-sectional view taken on the line 3—3 of Fig. 1, and Fig. 4 is a transverse cross-sectional view taken on the line 4—4 of Fig. 1.

Referring more particularly to the drawings, there is shown a filling horn or nozzle embodying the present invention particularly designed to fill continuous lengths of casing with any desired material which may be forced through the horn and into the casing from liquid to semi-solid materials, such as sausage meats, processed cheeses, etc.

The preferred form of horn or nozzle shown in the figures may comprise a hollow tube 11 of any suitable length. Tubes about 48 inches long have proved satisfactory, but may be longer or shorter as desired. The tube is provided at its inner end with a coupling 12 for connection to a conduit 13 through which the material to be packed or stuffed is fed under pressure to the filling device or horn.

The forward end 14 of the coupling is of reduced diameter being preferably of a size somewhat smaller than the inner diameter of the casing or container to be filled, so that the casing may fit loosely thereover. An O ring 15 is preferably provided about the reduced outer end of the coupling 12.

Throughout most of the length of the tube 11 its outer diameter is preferably smaller than the diameter of the reduced outer end 14 of the coupling 12, so that long lengths of the casing may be placed over the tube. At the forward or outer end of the tube 11 there is preferably provided a head 16 with an enlarged chamber 17 therein. A washer 18 having an inner diameter less than that of the chamber is secured in the head 16 by an adapter 19 threaded into the outer end of the head 16, and defines the forward end of the chamber 17. A bushing 21 is threaded on the outer end of the adapter 19 and the outer end or nose of the horn 22 is secured to the bushing 21, forming an annular channel about the adapter 19 between the forward end of the head 16 and the rear end of the nose 22, in which is positioned an annular ring or barrier 23. The ring or barrier is preferably made of deformable or resilient material such as neoprene, and diverges from its rear or inner end, where it is substantially the same size as the adjoining head 16, to the forward end thereof where its diameter is substantially the same as, or slightly greater than, the inner diameter of the casing to be filled through the use of the horn.

With this construction the casing may be pulled forwardly over the barrier or ring 23 and will fit tightly thereabout and in some instances may necessarily compress the ring 23 to some extent. The rear portion of the nose 22 of the filling horn has a diameter less than that of the adjoining portion of the ring 23 and may suitably be substantially the same as that of the head 16. The forward portion of the nose 22 tapers inwardly or converges so that the discharge end of the nose has a diameter very much smaller than the inner diameter of the casing to be filled. This permits the casing to be constricted adjacent the nose so it may be readily crimped after it has received a charge of material, without greatly increasing the pressure either within the filled portion of the casing or rearwardly thereof, as would be the case if the discharge end of the nose were of nearly the same size as the inner diameter of the casing.

Positioned in the chamber 17 of the head 16 is a shut-off valve 24 which is preferably fluid operated. A suitable valve of this type, which may be called a sphincter valve, is disclosed in Patent No. 2,756.959 dated July 31, 1956. Such a valve comprises a length of rigid tubular casing 25 with an elastic tubular member 26, substantially longer than the tubular casing 25, positioned in the casing with the ends of the elastic tubular member bent back over the ends of the casing 25. A pair of O rings 27 are arranged about the periphery of the tubular casing 25 and tightly engage the surrounding walls of the chamber 17 forming a circumferential passageway 27a therebetween. Openings 28 are formed through the tubular casing 25 and communicate with the passageway 27a, and a conduit 29 connected to a pressure line 31 in the coupling 12 also communicates with the passageway 27a. The pressure line 31 may be connected to a pressure tank or any other suitable source of fluid pressure. Valves are provided in the pressure line for controlling the flow of fluid under pressure therethrough.

With this type of construction, when the valve in the pressure line 31 is open, fluid under pressure flows through the conduit 29 and through the openings 28 in the tubular casing 25 of the valve forcing the elastic tubular member 26 inwardly to its closed position shown by dotted lines in Fig. 2. As soon as this pressure is released, the elastic tubular member 26 resumes its normal tubular shape shown in full lines in Fig. 2, and the valve is wide open. The inner diameter of the elastic tubular member 26 is preferably substantially the same as, or slightly smaller than, the diameter of the discharge passageway on each side thereof. Accordingly, when the valve 24 is open, the material may readily flow through the passageway in the tube 11 and when the valve is closed, the flow of material therethrough is prevented.

Control means are provided for retarding the passage of the casing over the head 16 and nose 22. As the material is discharged from the nose 22 into the casing section or portion which is closed, the casing is pulled over the head and nose due to the pressure of the material flowing into the casing. In order to insure that the casing is properly filled and to maintain the casing smooth and free from wrinkles, it is desirable to employ control means to retard the movement of the casing over the nose. In the modification shown, the control means may comprise a circumferential groove 32 about the head 16 rearwardly of the ring or barrier 23. A suction line 33 communicates with the groove 32 and connects the groove to a pump or other suitable suction means. The casing passing over the head is drawn by the suction into the groove 32, so that its movement over the head and nose of the horn is sufficiently retarded. The O ring 15 about the coupling 12 prevents the entry of atmospheric air beneath the casing lying between the O ring 15 and the barrier 23.

To operate the device, a continuous or long length of casing is arranged over the tube 11, as shown in Fig. 1, with the forward end passing over the head 16 and horn 22. The end of the casing beyond the nose is closed off or fastened together by clips or any other suitable means. The pump or other suction means is operated continuously to retard the passage of the casing over the head and nose at all times. With the valve 24 in open position, the material supplied to the tube under pressure passes therethrough and out the discharge opening in the nose 22, thereby filling a portion of the casing and forcing the casing forwardly from the nose 22. The casing is preferably maintained adjacent the relatively narrow periphery of the nose 22 by the hand of the operator of the device or by any suitable apparatus, so that the portion of the casing immediately in front of the discharge end of the nose 22 is constricted in size, being preferably about as small as the outer diameter of the discharge end of the nose. Due to the pressure of the material being fed through the horn, there is a tendency for some of it to back up within the casing over the inside of the nose. However, the barrier or ring 23 seals this portion of the casing and prevents the passage of the material or gases or liquids contained therein rearwardly of the barrier 23. As pressure on the front face of the barrier increases, the barrier tends to increase in size, engaging the casing more tightly.

When the desired charge of material has been fed through the horn and into the casing portion, the valve in the pressure line is opened and fluid under pressure is supplied to the valve 24, thereby closing it and preventing a further supply of the material to the casing. At this time the casing in front of the horn, where it is constricted, is clipped together or tied off, thus closing the just filled casing portion. In order to permit separation of the filled casing portions, two adjacent clips are preferably positioned about the casing between each of the charges of material. This permits the casing to be cut between each pair of clips without permitting the escape of any material from the ends of the casing portions.

The present device permits sections of casings to be filled with the desired amounts of material with little or no attention from the operator except to constrict the casing adjacent the nose, clip the sections of the casing between charges of material therein, and control the supply of pressure to the valve 24. The device may be readily disassembled and cleaned as is essential with food-handling apparatuses. After being cleaned and sterilized, it may be quickly and easily assembled.

Instead of employing continuous lengths of preformed casing positioned over the filling horn as hereinabove described, the casing may be continuously formed into a tube above the horn adjacent its discharge end from a flat strip of suitable material. In either situation a continuous length of casing may be fed over the head 16 and nose 22 to filling position. The present apparatus may also be employed if desired to fill individual lengths of casing placed in filling position.

While particular embodiments of this invention have been illustrated and described, it will be understood, of course, that the invention is not to be limited thereto, since many modifications may be made, and it is contemplated, therefore, by the appended claims, to cover any such modifications as fall within the true spirit and scope of this invention.

I claim:

1. A filling device for filling continuous lengths of casing with charges of material comprising a tubular member having a discharge passageway therein and a discharge nose over which said casing passes, barrier means about said tubular member adjacent the discharge end thereof of a size and shape to tightly engage the inner surface of said casing thereover to close off the portion of said casing outwardly of said barrier from the portion inwardly thereof, and control mechanism associated with said member for controlling the feed of said casing from said member, said control mechanism including suction means positioned inwardly of said barrier means.

2. A filling device for filling continuous lengths of casing with charges of material comprising a tubular member having a discharge passageway therein and a discharge nose over which said casing passes, barrier means about said tubular member adjacent the discharge end thereof of a size and shape to tightly engage the inner surface of said casing thereover to close off the portion of said casing outwardly of said barrier from the portion inwardly thereof, and control mechanism associated with said member for controlling the feed of said casing from said member, said control mechanism comprising suction means about said tubular member inwardly of said barrier.

3. A filling device for filling continuous lengths of casing with charges of material comprising a tubular member having a discharge passageway therein and a discharge nose over which said casing passes, barrier means about said tubular member adjacent the discharge end thereof of a size and shape to tightly engage the inner surface of said casing thereover to close off the portion of said casing outwardly of said barrier from the portion inwardly thereof, and control mechanism associated with said member for controlling the feed of said casing from said member, said control mechanism comprising a circumferential groove in said member communicating with the periphery of said member, suction producing means, and a conduit for connecting said suction producing means to said groove.

4. A filling device for filling continuous lengths of casing with charges of material comprising a tubular member having a discharge passageway therein and a discharge nose over which said casing passes, barrier means tightly secured about said tubular member adjacent the discharge end thereof having an external size and shape substantially the same as the internal size and shape of said casing when expanded to tightly engage the inner surface of said expanded casing thereover to close off the portion of said casing outwardly of said barrier from the portion inwardly thereof, fluid pressure operated sphincter valve means in said passageway adjacent the discharge end thereof operable to close and open said passageway, fluid pressure producing means, and a conduit for connecting said pressure producing means to said valve.

5. A filling device for filling continuous lengths of casing with charges of material comprising a tubular member having a discharge passageway therein and a discharge nose over which said casing passes, said discharge nose converging toward the discharge end thereof and having a terminal cross-sectional area substantially less than the inner cross-sectional area of said casing, barrier means about said tubular member adjacent the discharge end thereof of a size and shape to tightly engage the inner surface of said casing thereover to close off the portion of said casing outwardly of said barrier from the portion inwardly thereof, and control mechanism associated with said member for controlling the feed of said casing from said member, said control mechanism including suction means positioned inwardly of said barrier means.

References Cited in the file of this patent

UNITED STATES PATENTS

| | | |
|---|---|---|
| 872,294 | Hambruch | Nov. 26, 1907 |
| 1,292,645 | Reisfeld | Jan. 28, 1919 |
| 1,366,183 | Hottmann | Jan. 18, 1921 |
| 1,518,511 | Henderson | Dec. 9, 1924 |
| 2,168,693 | Walter | Aug. 8, 1939 |
| 2,749,572 | Nowak | June 12, 1956 |

FOREIGN PATENTS

| | | |
|---|---|---|
| 179,498 | Germany | Sept. 10, 1954 |